United States Patent
Kim et al.

(10) Patent No.: US 10,073,310 B2
(45) Date of Patent: Sep. 11, 2018

(54) LIQUID CRYSTAL DISPLAY DEVICE

(71) Applicant: SAMSUNG DISPLAY CO., LTD., Yongin-si, Gyeonggi-do (KR)

(72) Inventors: Hyunsik Kim, Hwaseong-si (KR); Heejin Kim, Hwaseong-si (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 84 days.

(21) Appl. No.: 15/161,381

(22) Filed: May 23, 2016

(65) Prior Publication Data
US 2016/0357043 A1  Dec. 8, 2016

(30) Foreign Application Priority Data

Jun. 2, 2015 (KR) .................. 10-2015-0077911

(51) Int. Cl.
*G02F 1/135*  (2006.01)
*G02F 1/1362*  (2006.01)
*G02F 1/1343*  (2006.01)

(52) U.S. Cl.
CPC ........ *G02F 1/1354* (2013.01); *G02F 1/13624* (2013.01); *G02F 2001/134345* (2013.01)

(58) Field of Classification Search
CPC .................................................... G02F 1/1354
See application file for complete search history.

(56) References Cited

U.S. PATENT DOCUMENTS

| | | | |
|---|---|---|---|
| 7,532,269 B2 | 5/2009 | Ahn | |
| 7,619,286 B2 * | 11/2009 | Park | G02F 1/133512 257/390 |
| 7,995,155 B2 | 8/2011 | Yang et al. | |
| 8,520,160 B2 | 8/2013 | You et al. | |
| 8,570,265 B2 | 10/2013 | Jung et al. | |
| 8,803,855 B2 | 8/2014 | Goh et al. | |
| 8,854,287 B2 | 10/2014 | Goh et al. | |
| 2012/0033148 A1 | 2/2012 | Yang et al. | |
| 2012/0257142 A1 * | 10/2012 | Yamauchi | G02F 1/135 349/64 |

FOREIGN PATENT DOCUMENTS

| | | |
|---|---|---|
| JP | 2007279093 A | 10/2007 |
| KR | 1020060074547 A | 7/2006 |
| KR | 10201000100228 A | 9/2010 |
| KR | 1020110117998 A | 10/2011 |
| KR | 1020120021537 A | 3/2012 |

(Continued)

OTHER PUBLICATIONS

Seung-Eon Ahn et al., Metal Oxide Thin Film Phototransistor for Remote Touch Interactive Displays, article, May 2012, pp. 2631-2636, 24, Advanced Materials, Wiley-VCH Verlag GmbH & Co. KGaA, Weinheim.

*Primary Examiner* — Nimeshkumar Patel
*Assistant Examiner* — Jacob R Stern
(74) *Attorney, Agent, or Firm* — Cantor Colburn LLP

(57) ABSTRACT

A liquid crystal display ("LCD") device has a pixel structure which enhances a viewing angle of the LCD device through the use of a sub-pixel in which a gray scale varies during a display period and to which a photoconductive element is applied, the photoconductive element including a photoconductive layer of which a resistance level varies corresponding to an amount of light.

17 Claims, 13 Drawing Sheets

(56) References Cited

FOREIGN PATENT DOCUMENTS

| | | |
|---|---:|---:|
| KR | 101295298 B1 | 8/2013 |
| KR | 1020130104521 A | 9/2013 |
| KR | 101358334 B1 | 1/2014 |
| KR | 101371604 B1 | 2/2014 |
| KR | 101458903 B1 | 10/2014 |

\* cited by examiner

LIQUID CRYSTAL DISPLAY DEVICE

This application claims priority to Korean Patent Application No. 10-2015-0077911, filed on Jun. 2, 2015, and all the benefits accruing therefrom under 35 U.S.C. § 119, the content of which in its entirety is herein incorporated by reference.

BACKGROUND

1. Field

Exemplary embodiments of embodiments of the invention relate to a liquid crystal display ("LCD") device with enhanced side visibility and a driving method thereof.

2. Description of the Related Art

With the advent of a highly developed information technology era, there are growing demands for flat panel display ("FPD") devices having various advantages such as slimness, lightweight, and low power consumption. Among FPD devices, liquid crystal display ("LCD") devices are being used in a wide range of applications, such as monitors of laptop computers or desktop computers, for the benefit of high resolution, excellent color display, high image quality, and the like.

An LCD device generally includes two substrates including electrodes formed on opposing surfaces of the two substrates, respectively. Liquid crystal materials are injected between the two substrates, and liquid crystal molecules are rearranged by an electric field generated by voltages that are applied to the two electrodes, whereby an image is displayed based on the transmittance of light which is adjusted by the rearrangement of the liquid crystal molecules.

The LCD device includes a liquid crystal panel disposed between the two substrates and injected with liquid crystals, a backlight unit disposed below the liquid crystal panel and used as a light source, and a driving unit disposed outwardly of the liquid crystal panel to drive the liquid crystal panel.

To enhance a viewing angle characteristic of an LCD device, development is being made on various types of the LCD device, such as a patterned vertical alignment ("PVA") mode in which liquid crystals are vertically aligned, a multi-domain vertical alignment ("MVA") mode in which liquid crystals are aligned in various directions in a single pixel, a super-patterned vertical alignment ("S-PVA") mode, and the like.

Among the various types of the LCD device, in an S-PVA mode LCD device, a pixel includes two sub-pixels, and the two sub-pixels are driven at different voltages.

SUMMARY

Exemplary embodiments of embodiments of the invention are directed to a vertical alignment mode liquid crystal display ("LCD") device having a pixel structure including two sub-pixels that are driven at different voltages using a common gate line and a common data line.

According to an exemplary embodiment of the invention, an LCD device includes a first substrate, a second substrate opposing the first substrate, a liquid crystal layer between the first substrate and the second substrate, a gate line on a surface of the first substrate, the gate line extending in a first direction and receiving a gate signal, a data line extending in a second direction that intersects the first direction, and receiving a data signal, and a pixel connected to the gate line and the data line, where the pixel includes a first sub-pixel electrode, a first transistor connected to the gate line, the data line, and the first sub-pixel electrode, the first transistor outputting the data voltage to the first sub-pixel electrode, a second sub-pixel electrode, a second transistor connected to the gate line, the data line, and the second sub-pixel electrode, the second transistor outputting the data voltage to the second sub-pixel electrode, a photoconductive element connected to the second transistor, the photoconductive element including a photoconductive layer of which a resistance level varies corresponding to an amount of light, and a charge leakage electrode connected to the photoconductive element and applying a reference potential.

In an exemplary embodiment, the photoconductive element may be one of a thin film transistor ("TFT"), a photodiode, a photoconductive resistor, and a resistance memory.

In an exemplary embodiment, the photoconductive element may include a gate electrode, a source electrode, a data electrode, and an active layer.

In an exemplary embodiment, the gate electrode of the photoconductive transistor may be disposed below the active layer.

In an exemplary embodiment, the gate electrode of the photoconductive transistor may have a width less than that of the active layer.

In an exemplary embodiment, the gate electrode of the photoconductive transistor may be opaque.

In an exemplary embodiment, the drain electrode of the photoconductive transistor may be electrically connected to the charge leakage electrode.

In an exemplary embodiment, the gate electrode and the drain electrode of the photoconductive transistor may be electrically connected to one another.

In an exemplary embodiment, the pixel may further include a storage electrode overlapping at least a side of one of the first and second sub-pixel electrodes while being insulated therefrom, and the storage electrode may be electrically connected to the charge leakage electrode.

In an exemplary embodiment, the pixel may further include a common electrode on the second substrate, the common electrode opposing one of the first and second sub-pixel electrodes and being electrically connected to the charge leakage electrode.

In an exemplary embodiment, the liquid crystal layer may include a vertically aligned liquid crystal.

In an exemplary embodiment, the second sub-pixel may have an area different from that of the first sub-pixel in size.

In an exemplary embodiment, the LCD device may further include a black matrix overlapping the gate line and the data line.

In an exemplary embodiment, an aperture may be defined in a portion of the black matrix overlapping the photoconductive element.

In an exemplary embodiment, a thickness of a portion of the black matrix overlapping the photoconductive element may be less than a thickness of a portion of the black matrix not overlapping the photoconductive element.

In an exemplary embodiment, the black matrix may be disposed on one of the first and second substrates.

The foregoing is illustrative only and is not intended to be in any way limiting. In addition to the illustrative exemplary embodiments, embodiments, and features described above, further exemplary embodiments, embodiments, and features will become apparent by reference to the drawings and the following detailed description.

BRIEF DESCRIPTION OF THE DRAWINGS

The above and other features and exemplary embodiments of the invention of invention will be more clearly understood from the following detailed description taken in conjunction with the accompanying drawings, in which.

DETAILED DESCRIPTION

Figure 1:
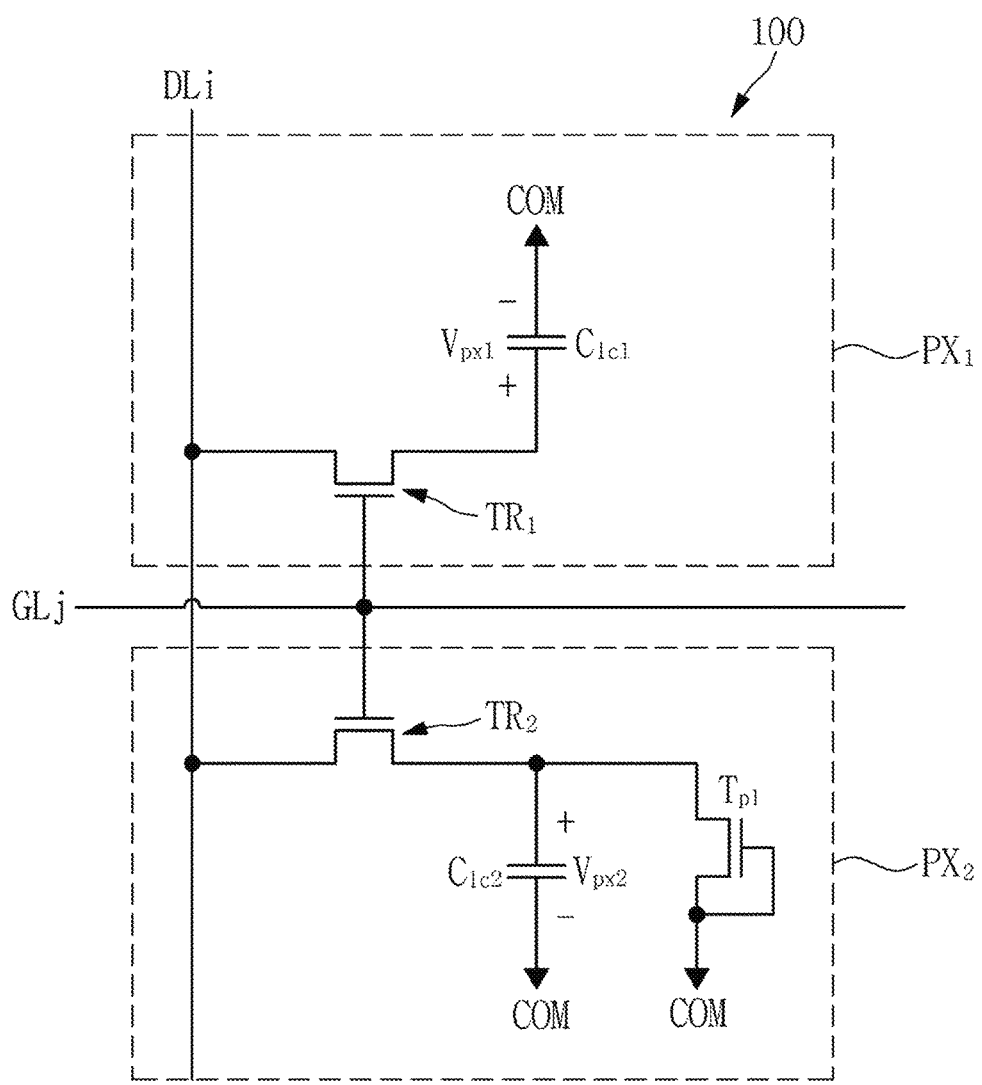
FIG. 1 is an equivalent circuit view of an exemplary embodiment of a pixel of a liquid crystal display ("LCD") device according to the invention.

Exemplary embodiments will now be described more fully hereinafter with reference to the accompanying drawings.

Although the invention can be modified in various manners and have several embodiments, specific embodiments are illustrated in the accompanying drawings and will be mainly described in the specification. However, the scope of the embodiments of the invention is not limited to the specific embodiments and should be construed as including all the changes, equivalents, and substitutions included in the spirit and scope of the invention.

It will be understood that, although the terms "first", "second", and the like, may be used herein to describe various elements, components, areas, layers and/or sections, these elements, components, areas, layers and/or sections should not be limited by these terms. These terms are only used to distinguish one element, component, area, layer or section from another element, component, area, layer or section. Thus, a first element, component, area, layer or section discussed below could be termed a second element, component, area, layer or section without departing from the teachings of example embodiments.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

When it is determined that a detailed description may make the purpose of the invention unnecessarily ambiguous in the description of the invention, such a detailed description will be omitted. In addition, the same components and corresponding components are given the same reference numeral.

Hereinafter, exemplary embodiments with reference to a configuration and operation of a liquid crystal display ("LCD") device will be more clearly understood from the following description taken in conjunction with the accompanying drawings.

FIG. 1 is an equivalent circuit diagram of a pixel of an LCD device according to an exemplary embodiment.

Referring to FIG. 1, a pixel 100 includes a gate line GLj, a data line DLi, a first sub-pixel $PX_1$, a second sub-pixel $PX_2$, a first transistor $TR_1$, a second transistor $TR_2$, a first liquid crystal capacitor $C_{1c1}$, a second liquid crystal capacitor $C_{1c2}$, and a photoconductive transistor $T_{p1}$.

Each of the first and second transistors $TR_1$ and $TR_2$ is connected to the gate line GLj and the data line DLi, and output data voltages in response to gate signals. One end of the first liquid crystal capacitor $C_{1c1}$ is a pixel electrode of the first sub-pixel $PX_1$ that is connected to the first transistor $TR_1$. Another end of the first liquid crystal capacitor $C_{1c1}$ is a common electrode that maintains a common voltage COM. The first liquid crystal capacitor $C_{1c1}$ receives the data voltage that is output from the first transistor $TR_1$, and the first liquid crystal capacitor $C_{1c1}$ is charged with a first pixel voltage $V_{px1}$.

In addition, one end of the second liquid crystal capacitor $C_{1c2}$ is a pixel electrode of the second sub-pixel $PX_2$ that is connected to the second transistor $TR_2$. Another end of the second liquid crystal capacitor $C_{1c2}$ is a common electrode. The second liquid crystal capacitor $C_{1c2}$ receives the data voltage that is output from the second transistor $TR_2$, and the second liquid crystal capacitor $C_{1c2}$ is charged with a second pixel voltage $V_{px2}$.

A source electrode of the photoconductive transistor $T_{p1}$ is connected to a drain electrode of the second transistor $TR_2$ and to the second liquid crystal capacitor $C_{1c2}$. A drain electrode of the photoconductive transistor $T_{p1}$ is electrically connected to the common voltage COM. The drain electrode of the photoconductive transistor $T_{p1}$ is also electrically connected to a gate electrode of the photoconductive transistor $T_{p1}$.

When an active layer between the source electrode and the drain electrode of the photoconductive transistor $T_{p1}$ is exposed to light, a leakage current flows to decrease a resistance level, thereby discharging the second pixel voltage $V_{px2}$ which is charged in the second liquid crystal capacitor $C_{1c2}$ to a potential of the common voltage COM. In particular, the common voltage COM of the photoconductive transistor $T_{p1}$ may have the same potential as that of the common voltage COM that maintains the second liquid crystal capacitor $C_{1c2}$. However, although not illustrated in FIG. 1, the leakage current may be discharged using a separate voltage source, for example, in another exemplary embodiment.

Figure 2A:
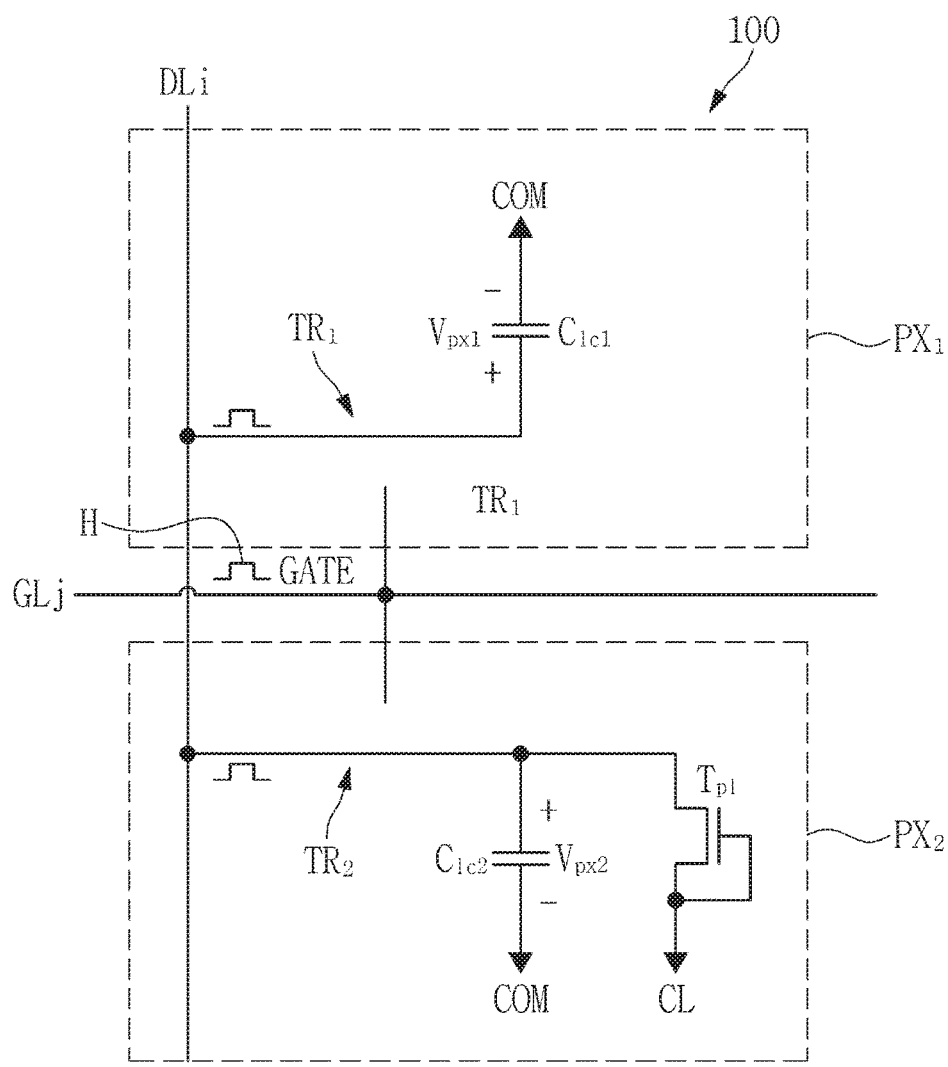
FIGS. 2A and 2B are circuit views illustrating operations of the circuit of FIG. 1 based on a gate signal.
Figure 2B:
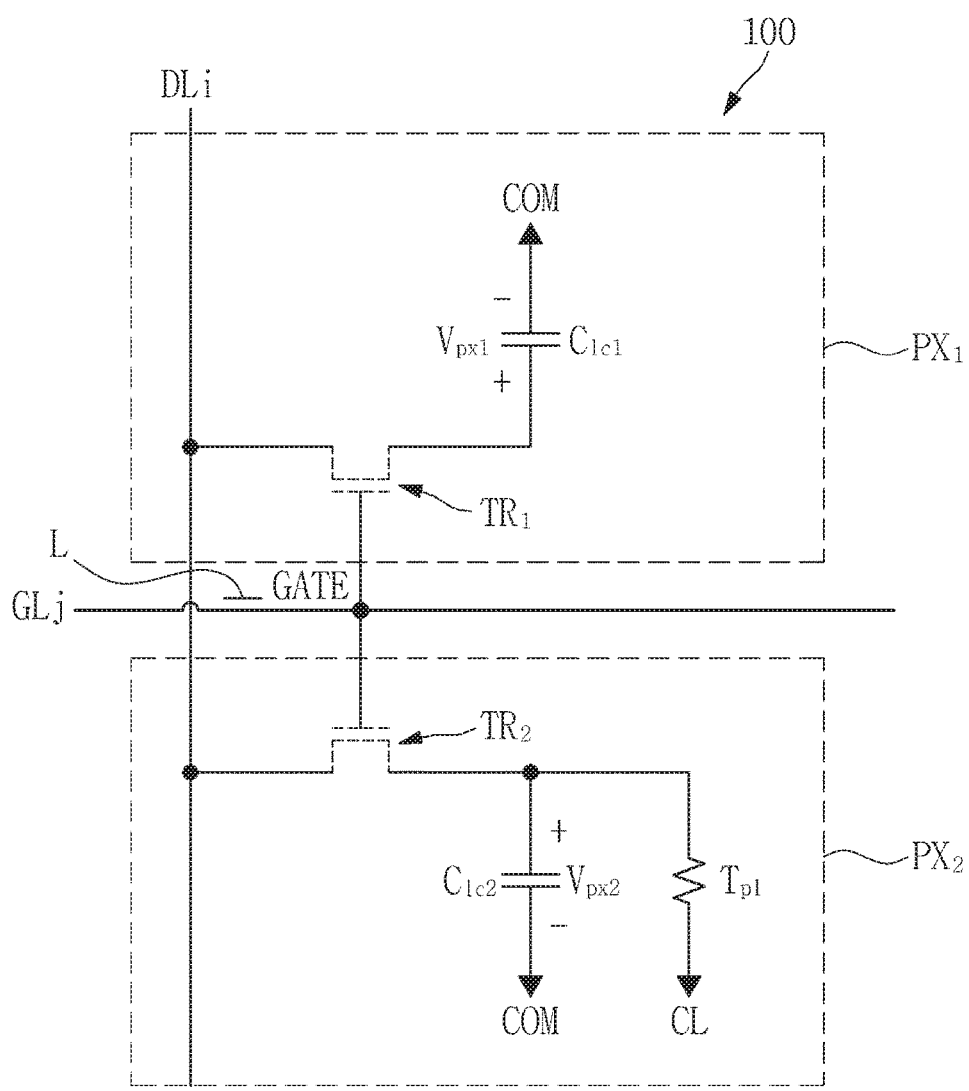
Figure 2C:
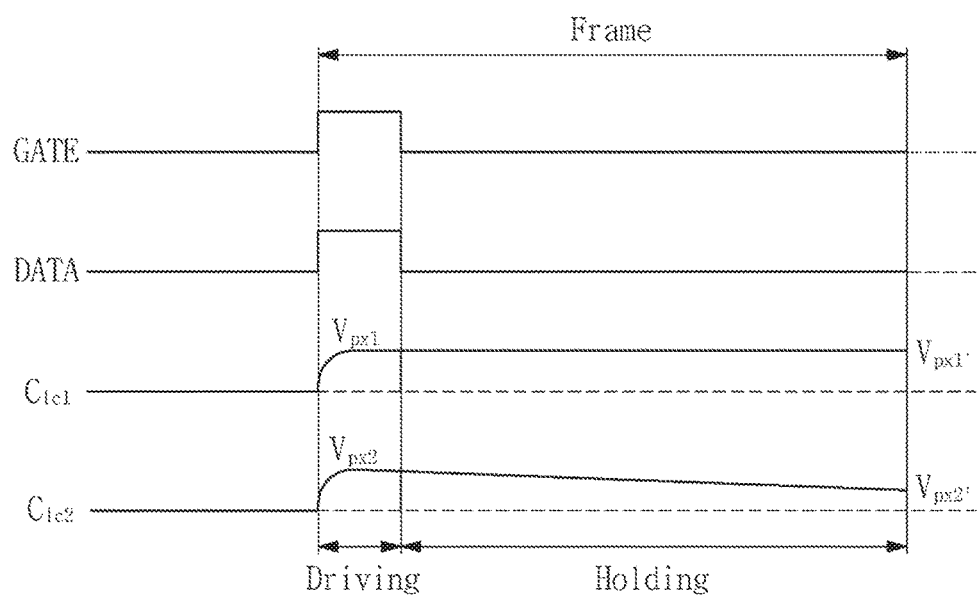
FIG. 2C is a timing diagram illustrating variations in first and second pixel voltages based on a gate signal.

FIGS. 2A and 2B are circuit diagrams illustrating an operation of the circuit of FIG. 1 based on a gate signal GATE. FIG. 2C is a timing diagram illustrating variations in the first and second pixel voltages $V_{px1}$ and $V_{px2}$ based on a gate signal GATE.

Referring to FIG. 2A, during a high period H of a gate signal GATE, the first liquid crystal capacitor $C_{1c1}$ and the second liquid crystal capacitor $C_{1c2}$ receive data voltages and are charged with the first pixel voltage $V_{px1}$ and the second pixel voltage $V_{px2}$, respectively. The first pixel voltage $V_{px1}$ and the second pixel voltage $V_{px2}$ are substantially the same voltages in that the first liquid crystal capacitor $C_{1c1}$ and the second liquid crystal capacitor $C_{1c2}$ are charged with data voltages during the same gate turned-on period of time via the same data line. However, while receiving the data voltage, light from a backlight unit is irradiated to the active layer of the photoconductive transistor $T_{p1}$, and thus the leakage current flows and the second pixel voltage $V_{px2}$ is discharged. Accordingly, the second pixel voltage $V_{px2}$ may have a lower level than that of the first pixel voltage $V_{px1}$.

Referring to FIG. 2B, while maintaining a low period L of the gate signal GATE subsequent to the high period H of the gate signal GATE, the first transistor $TR_1$ and the second transistor $TR_2$ are turned off by a low voltage level of the gate signal GATE, and the first liquid crystal capacitor $C_{1c1}$ and the second liquid crystal capacitor $C_{1c2}$ are disconnected from the data line DLj. The first sub-pixel $PX_1$ and the second sub-pixel $PX_2$ represent a gray scale by controlling an amount of transmitted light from the backlight unit based on the pixel voltage stored in the liquid crystal capacitor of each sub-pixel.

The first sub-pixel $PX_1$ represents a predetermined gray scale based on the first pixel voltage $V_{px1}$ stored in the first liquid crystal capacitor $C_{1c1}$.

The photoconductive transistor $T_{p1}$ connected to the second liquid crystal capacitor $C_{1c2}$ of the second sub-pixel $PX_2$ is exposed to external light of the backlight unit, whereby the leakage current flows between the source electrode and the drain electrode of the photoconductive transistor $T_{p1}$. The leakage current flowing therebetween may be represented as a resistor in the equivalent circuit of FIG. 2B. One end of the photoconductive transistor $T_{p1}$ is connected to a common voltage COM. The common voltage COM maintains a level lower than that of the second pixel voltage $V_{px2}$. The voltage charged in the second liquid crystal capacitor $C_{1c2}$ is discharged to a level of the common voltage COM by the photoconductive transistor $T_{p1}$ and continuously decreases. Accordingly, the second sub-pixel $PX_2$ represents a gray scale continuously decreasing over time.

Referring to FIG. 2C, a frame period corresponds to a high period H of a gate voltage, and is divided into a driving period during which a liquid crystal capacitor of each pixel is charged and a holding period during which a gray scale is represented.

During the holding period, the voltage charged in the first liquid crystal capacitor $C_{1c1}$ maintains a substantially invariable level of the first pixel voltage $V_{px1}$. That is, the voltage $V_{px1}$, of the first liquid crystal capacitor $C_{1c1}$ in the holding period may have the substantially the same voltage level as that of the first pixel voltage $V_{px1}$. In contrast, the voltage charged in the second liquid crystal capacitor $C_{1c1}$ is continuously discharged by the leakage current of the photoconductive transistor $T_{p1}$, and decreases from the level of the second pixel voltage $V_{px2}$ to a level of a second pixel leakage voltage $V_{px2}'$. Accordingly, the gray scale represented by the second sub-pixel $PX_2$ continuously decreases during the frame period.

A user recognizes the gray scale represented by the second sub-pixel $PX_2$ as an average value of the gray scales represented during the frame period. The pixel 100 may represent different gray scales in the first sub-pixel $PX_1$ and the second sub-pixel $PX_2$ using a single gate line and a single data line. In this manner, the side visibility of a display panel may be enhanced even by using a relatively simple circuit configuration of a vertical alignment LCD device.

An amount of charge leaked from the charge stored in the second liquid crystal capacitor $C_{1c2}$ is determined by the resistance level of the photoconductive transistor $T_{p1}$. The resistance level of the photoconductive transistor $T_{p1}$ is in proportion to an amount of light irradiated to the active layer. In other words, a period of time to discharge the voltage charged in the second liquid crystal capacitor $C_{1c2}$ may be adjusted by controlling the amount of light irradiated to the active layer.

Figure 3:
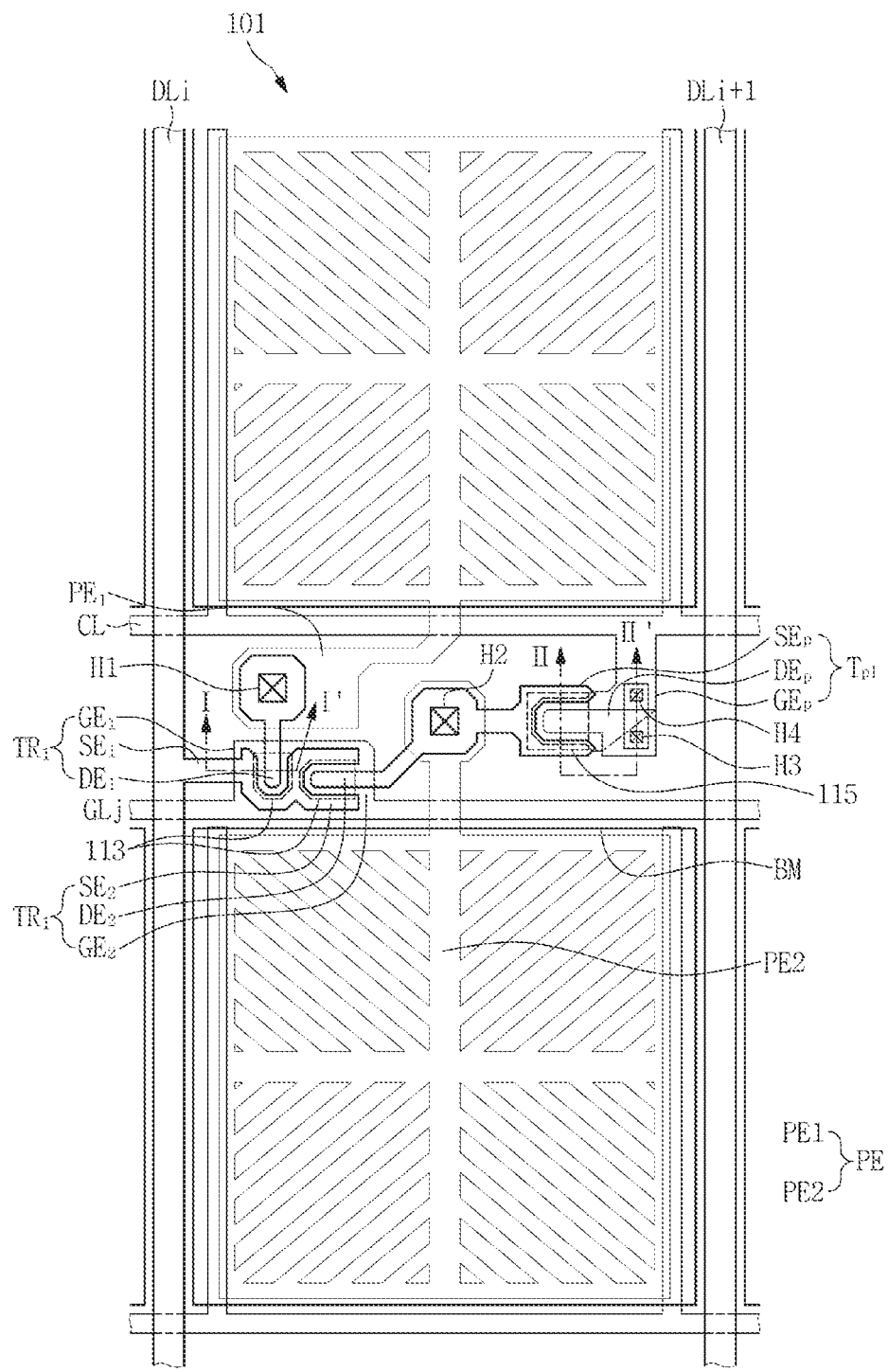
FIG. 3 is a plan view illustrating an exemplary embodiment of a pixel according to the invention.
Figure 4A:
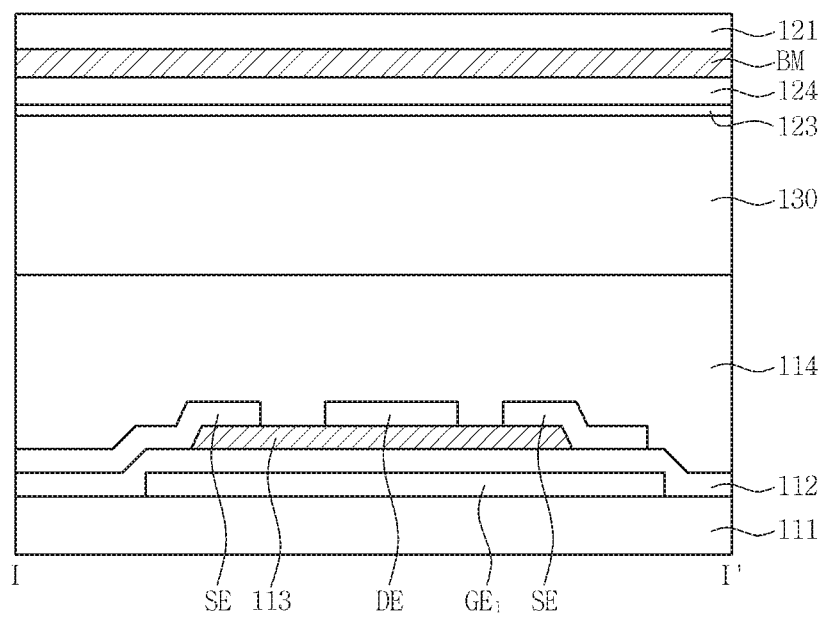
FIG. 4A is a cross-sectional view taken along line I-I' of FIG. 3.
Figure 4B:
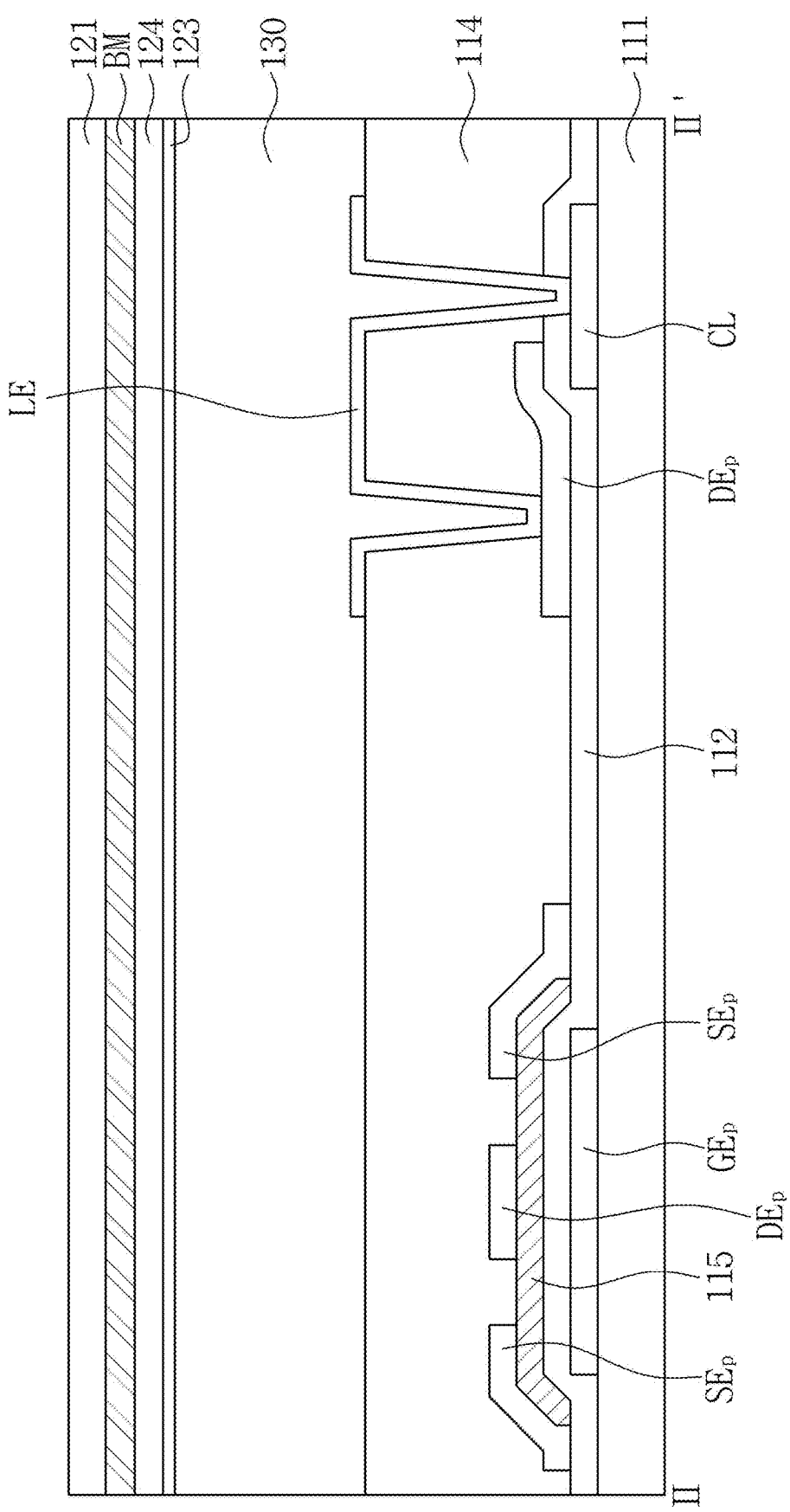
FIG. 4B is a cross-sectional view taken along line II-II' of FIG. 3.

FIG. 3 is a plan view illustrating a pixel 101 according to an exemplary embodiment. FIG. 4A is a cross-sectional view taken along line I-I' of FIG. 3. FIG. 4B is a cross-sectional view taken along line II-IF of FIG. 3.

Referring to FIGS. 3, 4A, and 4B, an LCD device includes a first substrate 111, a second substrate 121, and a liquid crystal layer 130 between the first substrate 111 and the second substrate 121 and sealed therebetween. A gate line GL, a data line DL, a thin film transistor ("TFT"), a pixel electrode PE, and the like, are disposed on the first substrate 111. A black matrix BM, a color filter (not illustrated), a common electrode 123, and a passivation layer 124 are disposed on the second substrate 121.

The pixel 101 includes the gate line extending in a first direction, the data line extending in a second direction intersecting the first direction. The gate line and the data line are insulated from one another by a gate insulating layer 112 and intersect one another. In addition, the pixel 101 may further include a storage electrode CL. The storage electrode CL overlaps each pixel electrode PE along an outer circumferential portion of the pixel electrode PE while being insulated from the pixel electrode PE. The storage electrode CL maintains a level of a common voltage COM so as to maintain a level of a voltage charged in a liquid crystal capacitor. The pixel electrode PE may be disposed between data lines the data line DLj and the data line DLj+1.

The pixel 101 includes a first transistor $TR_1$, a second transistor $TR_2$, a first pixel electrode $PE_1$, a second pixel electrode $PE_2$, and a photoconductive transistor $T_{p1}$.

The first transistor $TR_1$ includes a first gate electrode $GE_1$ connected to a gate line $GL_j$, a first source electrode $SE_1$ connected to a data line $DLi$, and a first drain electrode $DE_1$ spaced apart from the first source electrode $SE_1$ at a predetermined interval. An active layer 113 is disposed between the first gate electrode $GE_1$, and the first source electrode $SE_1$ and the first drain electrode $DE_1$. Similarly, the second transistor $TR_2$ includes a second gate electrode $GE_2$ connected to the gate line $GL_j$, a second source electrode $SE_2$ connected to the data line $DLi$, and a second drain electrode $DE_2$ spaced apart from the second source electrode $SE_2$ at a predetermined interval. An active layer 113 is disposed between the second gate electrode $GE_2$, and the second source electrode $SE_2$ and the second drain electrode $DE_2$.

The gate electrodes $GE_1$ and $GE_2$ disposed respectively below the active layers 113 of the first and second transistors $TR_1$ and $TR_2$ each have a width greater than that of the active layer 113, such that the active layers 113 of the first and second transistors $TR_1$ and $TR_2$ are not exposed directly to light incident from a backlight unit.

The first pixel electrode $PE_1$ and the second pixel electrode $PE_2$ are provided on the passivation layer 114, and are electrically connected to the drain electrode $DE_1$ of the first transistor $TR_1$ and to the drain electrode $DE_2$ of the second transistor $TR_2$ through first and second contact holes H1 and H2, respectively.

The photoconductive transistor $T_{p1}$ includes a gate electrode $GE_p$, a source electrode $SE_p$ disposed on the gate electrode $GE_p$ and connected to the drain electrode $DE_2$ of the second transistor $TR_2$, a drain electrode $DE_P$ spaced apart from the source electrode $SE_p$ and connected to the gate electrode $GE_p$ and the storage electrode CL, and an active layer 115 between the gate electrode $GE_p$, and the source electrode $SE_p$ and the drain electrode $DE_p$. The gate electrode $GE_p$ of the photoconductive transistor $T_{p1}$ has a width less than that of the active layer 115, and does not overlap a portion of the active layer 115. The active layer 115 of the photoconductive transistor $T_{p1}$ may be exposed to light incident from the backlight unit. The drain electrode $DE_p$ of the photoconductive transistor $T_{p1}$ is connected to the gate electrode $GE_p$ via third and fourth contact holes H3 and H4 and via a bridge electrode BE. The gate electrode $GE_p$ of the photoconductive transistor $T_{p1}$ is connected to a charge leakage electrode LE. The charge leakage electrode LE is an electrode that applies a reference potential to the photoconductive transistor $T_{P1}$, and in the pixel 101 of FIG. 3, the charge leakage electrode LE and the storage electrode CL are electrically connected to one another. The charge leakage electrode LE may be electrically connected to the common electrode 123 on the second substrate 121, and may be connected to an external circuit via an additional wiring.

Figure 5:
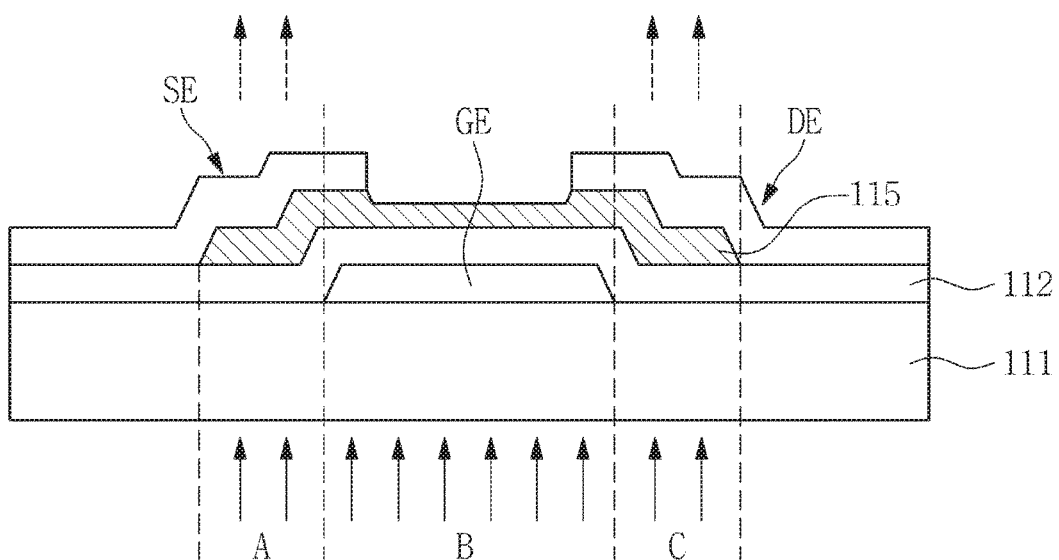
FIG. 5 is a cross-sectional view illustrating a transistor in which a light leakage current is generated.
Figure 6:
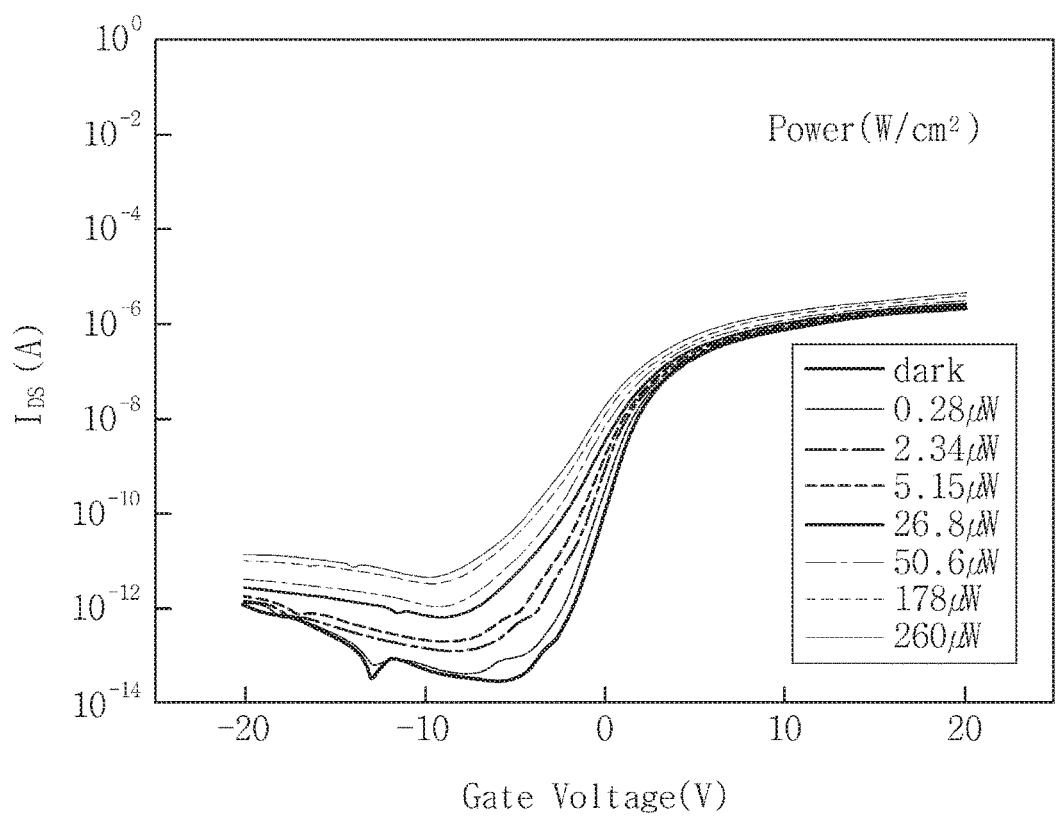
FIG. 6 is a set of graphs illustrating a light leakage phenomenon of amorphous silicon occurring based on a light source.

FIG. 5 is a cross-sectional view illustrating a TFT in which a light leakage current is generated. FIG. 6 is a set of graphs illustrating a light leakage phenomenon of the TFT that occurs based on a light source.

Referring to FIG. 5, the TFT includes, on a first substrate 111, a gate electrode GE, a gate insulating layer 112 insulating the gate electrode GE, an active layer 115 on the gate insulating layer 112, a source electrode SE and a drain electrode DE that are disposed on the active layer 115 and are spaced apart from one another. The source electrode SE and the drain electrode DE include the same material.

In an exemplary embodiment, the active layer 115 may include amorphous silicon injected with hydrogen (A-Si:H), for example. Since such an amorphous silicon transistor has a high light-absorbing coefficient, when the amorphous silicon transistor is exposed to a light source, a high-level off-state leakage current flows therein. The TFT of FIG. 5 is an inverted staggered type transistor, and the gate electrode GE is disposed between the active layer 115 and a light source of a backlight unit. The TFT includes the gate electrode GE having a width less than that of the active layer 115. The active layer 115 is divided into areas A, B, and C. The areas A and C are an area in which the active layer 115 is exposed to the light source of the backlight unit due to a relatively narrow width of the gate electrode GE. The area B is an area in which the light source of the backlight unit is obscured by the gate electrode GE. The off-state leakage current of the photoconductive transistor $T_{p1}$ varies based on the size of the areas A and C, the type and the luminance of the light source.

The inverted staggered type TFT has a structure in which the gate electrode GE is disposed below the active layer 115, and thus, light incident from the backlight unit may be blocked by expanding the area of the gate electrode GE. Accordingly, an additional light shielding member may be unnecessary below the active layer 115. However, an upper portion of the active layer 115 may be exposed to reflected light that is reflected or dispersed from an opposing substrate. Due to the reflected light, a leakage current may flow in the TFT. In an exemplary embodiment, to prevent the leakage current, a black matrix may be provided on the TFT to thereby block the reflected light.

FIG. 6 is a set of graphs illustrating an amount of irradiated light and an amount of leakage currents of a TFT.

Referring to FIG. 6, an x axis represents a gate voltage of the TFT, and a y axis represents a drain current. Each graph represents an amount of light that is irradiated to the TFT. In a dark state in which light is not irradiated, the amount of the leakage currents is the lowest. As the amount of irradiated light increases, even in an off-state period, an amount of leakage currents flowing into a drain electrode increases based on a gate voltage.

FIG. 6 illustrates the set of graphs based on the TFT using amorphous silicon injected with hydrogen (A-Si:H) as an active layer, for example. It may be appreciated from the set of graphs in FIG. 6 that the amount of the leakage currents when the active layer of the TFT is exposed to the light source is 100 nanoampere (nA) greater than that of the leakage currents when the active layer of the TFT is not exposed to the light source.

Figure 7:
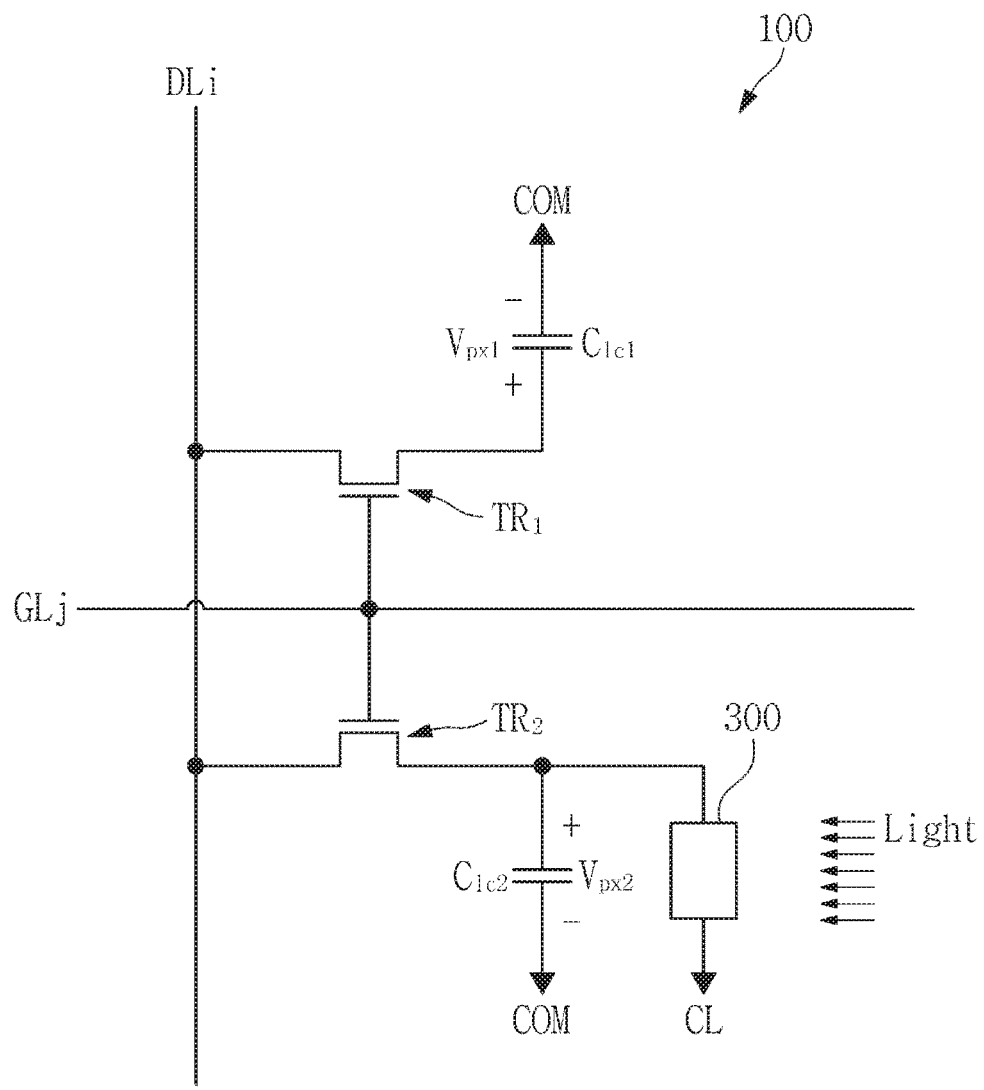
FIG. 7 is an equivalent circuit diagram of another exemplary embodiment of a pixel using a photoconductive element according to the invention.

FIG. 7 is an equivalent circuit view of a pixel 100 using a photoconductive element according to another exemplary embodiment.

Since a gate line GL, a data line DL, first and second transistors $TR_1$ and $TR_2$, a pixel liquid crystal capacitor $C_{1c}$, and the like, with reference to FIG. 7 are the same as or substantially similar to those described in the exemplary embodiments shown in FIG. 2B, a repeated description thereof will be omitted herein for conciseness. The photoconductive element 300 of FIG. 7 is an element exhibiting a photoconductive effect in which conductivity increases as the photoconductive element absorbs light. Examples of the photoconductive element may include a photo-resistor, a photodiode, cadmium sulfide ("CdS"), a TFT, a zinc oxide (ZnO) photoconductive element, and the like.

Figure 8:
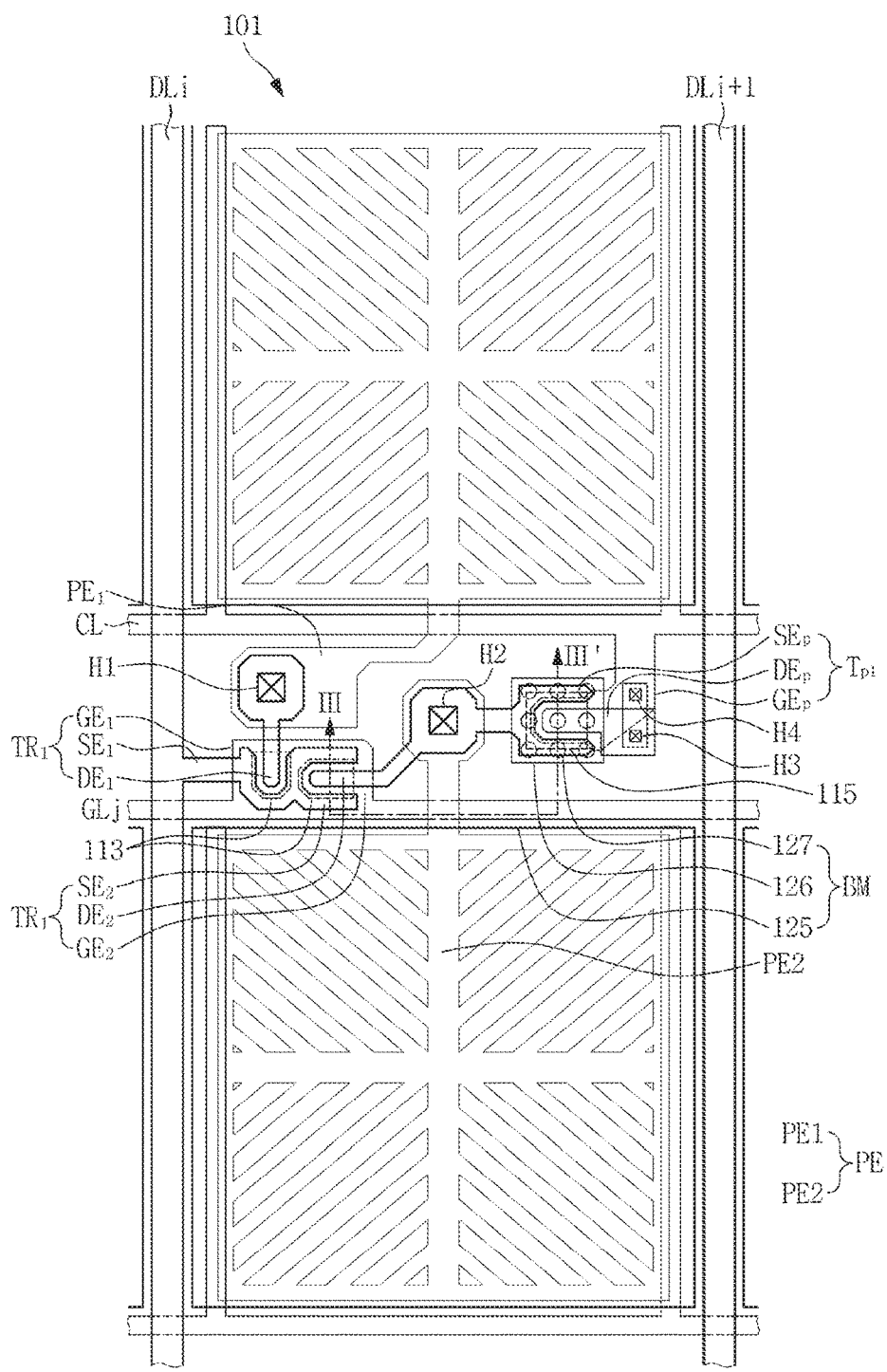
FIG. 8 is a plan view illustrating another exemplary embodiment of a pixel including a black matrix according to the invention.

FIG. 8 is a plan view illustrating a pixel 101 including a black matrix BM according to another exemplary embodiment.

Figure 9:
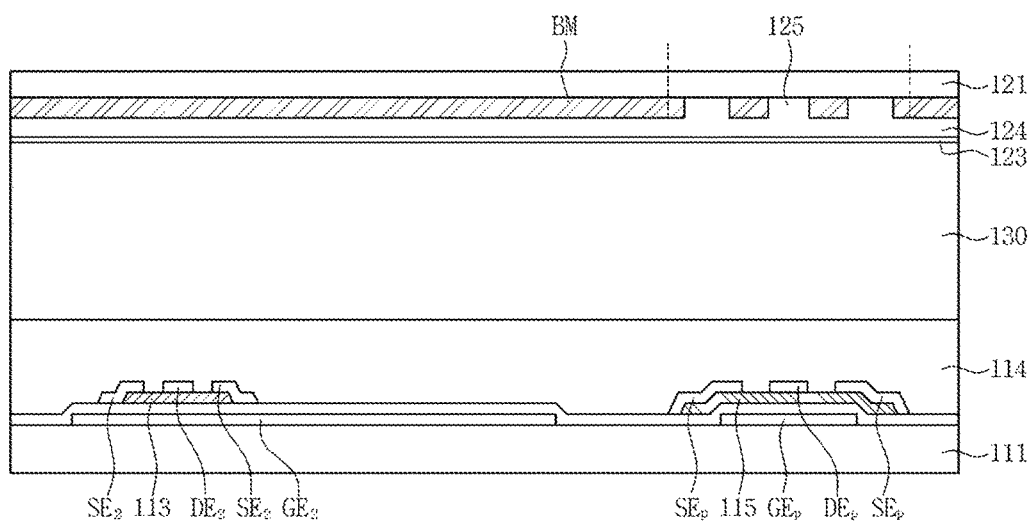
FIG. 9 is a cross-sectional view taken along line of FIG. 8.

FIG. 9 is a cross-sectional view taken along line III-III' of FIG. 8.

Referring to FIGS. 8 and 9, the black matrix BM is disposed in an area overlapping a gate line GL, a data line DL, a first transistor $TR_1$, a second transistor $TR_2$, and a photoconductive transistor $T_1$.

The black matrix BM may be provided by spraying an organic ink, or patterning a metal layer through a photolithography process. In an exemplary embodiment, the black matrix BM may include an organic light shielding layer including chromium (Cr), chromium oxide ($CrO_x$), or a resin, for example. In an exemplary embodiment, the organic light shielding layer may be a colored organic resin, for example, an acryl, epoxy or polyimide resin including one of carbon black and a black pigment.

The black matrix BM serves to enhance display quality by blocking reflected light that is reflected in a non-display area of a display panel, such as in the gate line GL, the data line DL, and the like. In addition, the black matrix BM serves to prevent a light from a backlight unit from being reflected from a second substrate 121 and from being irradiated to an active layer of a TFT on a first substrate 111.

The black matrix BM according to the illustrated exemplary embodiment serves to reflect a portion of the light from the backlight unit that is irradiated from a rear surface of the display panel to an active layer 115 of a photoconductive transistor $T_{p1}$. A leakage current that is generated by the photoconductive transistor $T_{p1}$ exposed to the reflected light discharges a second pixel voltage $V_{px2}$ stored in a second liquid crystal capacitor $C_{1c2}$ to a storage electrode CL.

A transparent aperture 125 is defined in a portion of the black matrix BM that is upwardly of the photoconductive transistor $T_{p1}$. The aperture 125 may include a plurality of apertures. The number and the shape of the apertures 125 of the black matrix BM are determined based on an amount of the leakage currents of the photoconductive transistor $T_{p1}$.

Figure 10:
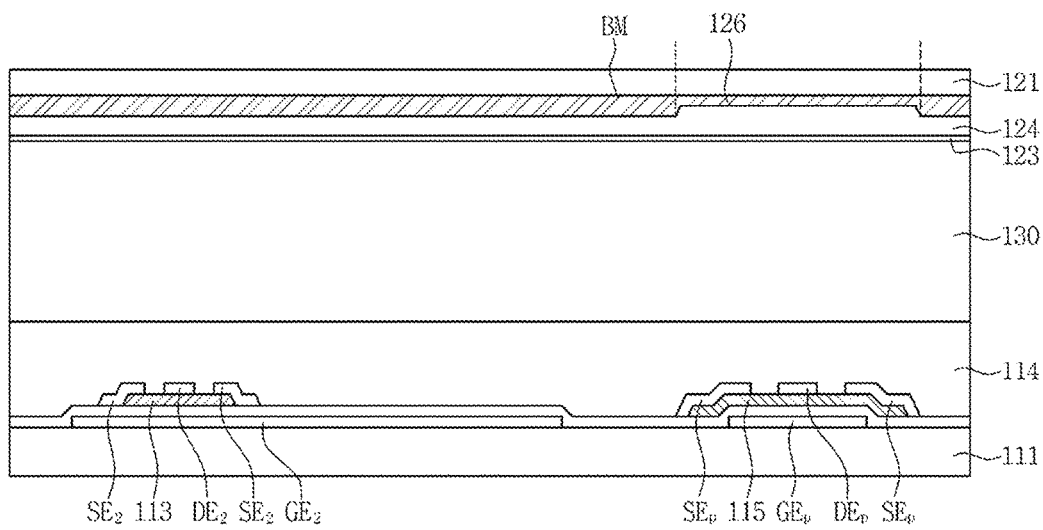
FIG. 10 is a cross-sectional view illustrating another exemplary embodiment of a pixel including a black matrix according to the invention.

FIG. 10 is a cross-sectional view illustrating a pixel including black matrices 126 and BM according to still another exemplary embodiment.

A black matrix 126 in an area overlapping a photoconductive transistor $T_{p1}$ has a thickness less than that of a black matrix BM in an area not overlapping the photoconductive transistor $T_{p1}$. As the thickness of the black matrix 126 decreases, the function of the black matrix 126 that blocks reflected light decreases, such that a relatively great amount of reflected light may be irradiated to the photoconductive transistor $T_{p1}$. In addition, an aperture 125 may be defined in the black matrix 126 overlapping the photoconductive transistor $T_{p1}$.

The black matrix BM may be provided in a single process to have different thicknesses based on a portion thereof. In a process of manufacturing the black matrix BM through light exposure and etching processes using a mask, the black matrix BM may be etched by adjusting an amount of light exposure thereon using a half tone mask ("HTM"), and the like, on a portion of the black matrix BM having a small thickness, to thereby have different thicknesses.

As set forth above, according to one or more exemplary embodiments, the LCD device may enhance image quality based on a viewing angle by allowing the two sub-pixels that are driven by sharing a common gate line and a common data line to be driven at different voltages.

From the foregoing, it will be appreciated that various embodiments in accordance with the disclosure have been described herein for purposes of illustration, and that various modifications may be made without departing from the scope and spirit of the teachings. Accordingly, the various embodiments disclosed herein are not intended to be limiting of the true scope and spirit of the teachings. Various features of the above described and other embodiments can be mixed and matched in any manner, to produce further embodiments consistent with the invention.

What is claimed is:

1. A liquid crystal display device comprising:
   a first substrate;
   a second substrate opposing the first substrate;
   a liquid crystal layer between the first substrate and the second substrate;
   a gate line which is disposed on a surface of the first substrate, extends in a first direction and receives a gate signal;
   a data line which extends in a second direction which intersects the first direction, and receives a data signal; and
   a pixel connected to the gate line and the data line and comprising:
   a first sub-pixel electrode;
   a first transistor which is connected to the gate line, the data line, and the first sub-pixel electrode, and outputs the data voltage to the first sub-pixel electrode;
   a second sub-pixel electrode;
   a second transistor connected to the gate line, the data line, and the second sub-pixel electrode, the second transistor outputting the data voltage to the second sub-pixel electrode;
   a photoconductive element which is connected to the second transistor and is not connected to the first transistor, and comprises a photoconductive layer of which a resistance level varies corresponding to an amount of light; and
   a charge leakage electrode which is connected to the photoconductive element and applies a reference potential.

2. The liquid crystal display device of claim 1, wherein the photoconductive element is at least one of a thin film transistor, a photodiode, a photoconductive resistor, and a resistance memory.

3. The liquid crystal display device of claim 2, wherein the photoconductive element comprises a gate electrode, a source electrode, a data electrode, and an active layer.

4. The liquid crystal display device of claim 3, wherein the gate electrode of the photoconductive transistor is disposed below the active layer.

5. The liquid crystal display device of claim 4, wherein the gate electrode of the photoconductive transistor has a width less than that of the active layer.

6. The liquid crystal display device of claim 4, wherein the gate electrode of the photoconductive transistor is opaque.

7. The liquid crystal display device of claim 4, wherein the drain electrode of the photoconductive transistor is electrically connected to the charge leakage electrode.

8. The liquid crystal display device of claim 7, wherein the gate electrode and the drain electrode of the photoconductive transistor are electrically connected to each other.

9. The liquid crystal display device of claim 7, wherein the pixel further comprises a storage electrode overlapping at least a side of one of the first and second sub-pixel electrodes while being insulated from the one of the first and second sub-pixel electrodes, and the storage electrode is electrically connected to the charge leakage electrode.

10. The liquid crystal display device of claim 7, wherein the pixel further comprises a common electrode on the second substrate, the common electrode opposing one of the first and second sub-pixel electrodes and being electrically connected to the charge leakage electrode.

11. The liquid crystal display device of claim 2, wherein the liquid crystal layer comprises a vertically aligned liquid crystal.

12. The liquid crystal display device of claim 11, wherein the second sub-pixel electrode has an area different from that of the first sub-pixel electrode in size.

13. The liquid crystal display device of claim 2, further comprising a black matrix overlapping the gate line and the data line.

14. The liquid crystal display device of claim 13, wherein an aperture is defined in a portion of the black matrix overlapping the photoconductive element.

15. The liquid crystal display device of claim 13, wherein a thickness of a portion of the black matrix overlapping the photoconductive element is less than a thickness of a portion of the black matrix not overlapping the photoconductive element.

16. The liquid crystal display device of claim 13, wherein the black matrix is disposed on one of the first and second substrates.

17. The liquid crystal display device of claim 1, wherein the first sub-pixel electrode and the second sub-pixel electrode are driven at different voltages when receiving the same gate signal and the same data signal.

* * * * *